Nov. 24, 1942.　　　　　A. F. ECKEL　　　　　2,303,113
REFLECTOR
Filed Dec. 30, 1939　　　　2 Sheets-Sheet 1
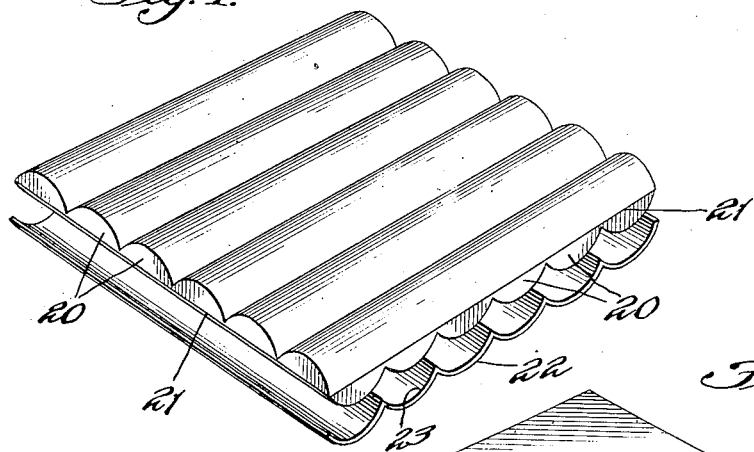
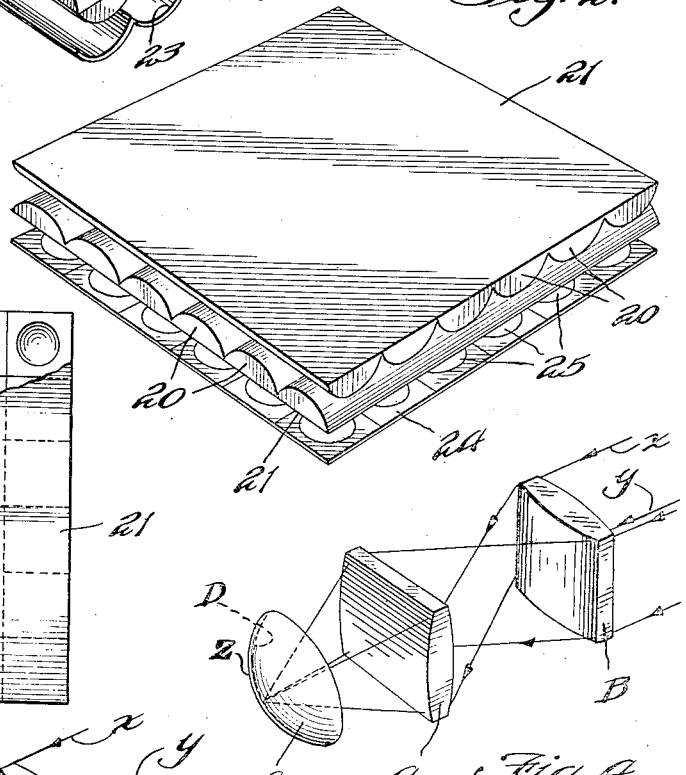
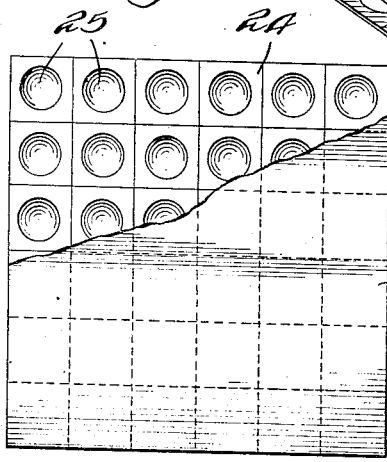
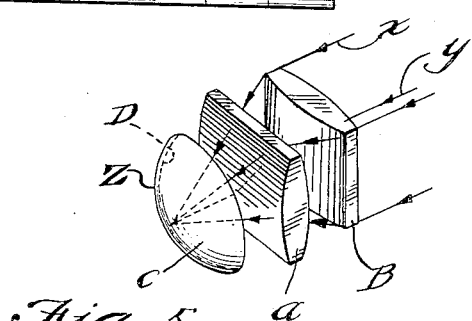
INVENTOR:
Arthur F. Eckel
BY Kent W. Wonnell
ATTORNEY.

Nov. 24, 1942.  A. F. ECKEL  2,303,113
REFLECTOR
Filed Dec. 30, 1939   2 Sheets-Sheet 2

INVENTOR:
Arthur F. Eckel
BY Kent W. Wonnell
ATTORNEY.

Patented Nov. 24, 1942

2,303,113

UNITED STATES PATENT OFFICE 2,303,113

REFLECTOR

Arthur F. Eckel, Wilmette, Ill.

Application December 30, 1939, Serial No. 311,725

11 Claims. (Cl. 88—82)

This invention relates in general to a new and improved lens reflector system adapted to produce an exceedingly efficient retroflective auto collimator reflector.

An important object of the invention is in the provision of two or more lens members, either in single units or in a plurality of connected units, each of which may be astigmatic, but which when arranged oppositely so far as the lens curvature is concerned, but adjacent and at right angles to each other, not only will correct for spherical aberration but also will produce an anastigmatic combination.

Another object of the invention is in the provision of such a curved system of cylindrical or spherical lenses which is made particularly retroflective and auto-collimating by the provision of a reflector spaced from and located at the rear of the lens system, the reflector having curved reflecting surfaces back of the lenses, either cylindrical or spherical, in which each surface has a radius of curvature equal to the equivalent focal length of the anastigmatic combination of the two lenses in front of it.

A still further object of the invention is in the provision of a reflector system of this type in which the opposite lens units for correcting astigmatic aberration may consist of two differently curved surfaces on each lens, or even opposite plane prismatic surfaces, either with or without a colored lens between them for setting up a design, and with a spherical or cylindrical reflector at the back of the system.

Other objects of the invention will appear hereinafter, the accompanying drawings illustrating the preferred form and a number of modified forms of the invention, in which, Fig. 1 is a perspective view of a reflector in accordance with the principles of this invention;

Fig. 2 is a similar perspective view showing the lens elements reversed;

Fig. 3 is a fragmentary view of a spherical type of reflector;

Figs. 4 and 5 are expanded and close coupled arrangements, respectively, of reflector units having straight cylindrical lenses and spherical reflectors;

Figure 6:
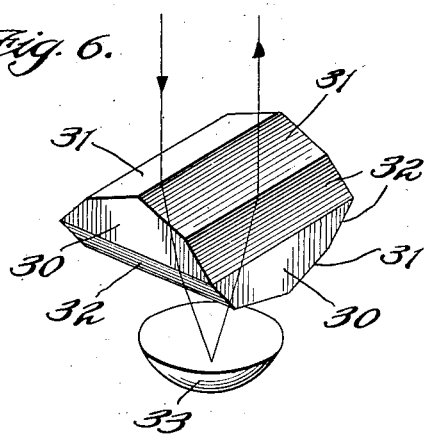
Figure 7:
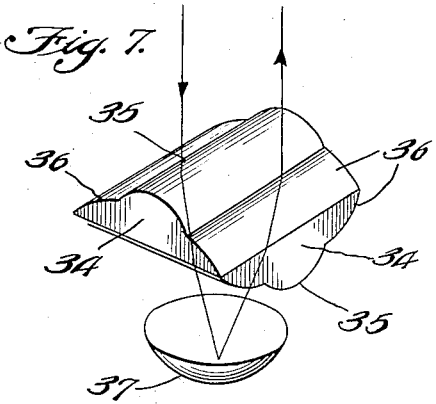
Figure 8:
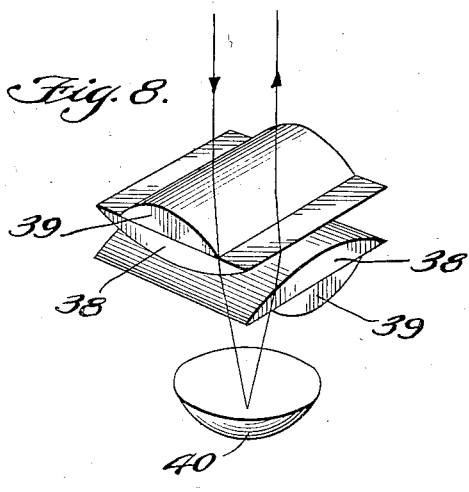
Figure 9:
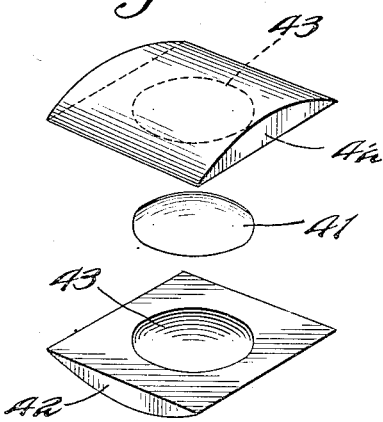
Figure 10:
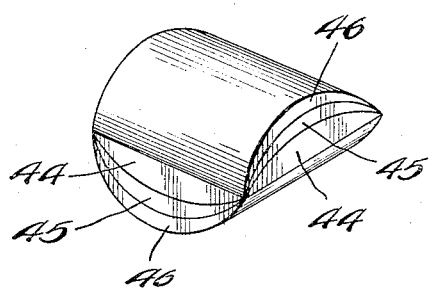
Figure 11:
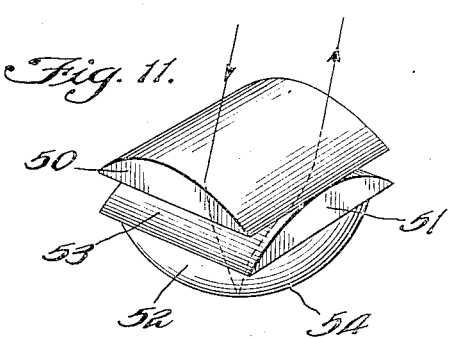

Figs. 6, 7, and 8 are views of different forms of lens units as contemplated by this invention;

Fig. 9 shows a lens unit which includes a colored section for building sign or character designs;

Fig. 10 shows another type of lens unit composed of a plurality of complementary lens sections;

Fig. 11 shows a lens unit in which a spherical reflector portion is incorporated as a part of one of the lens units.

In the reflectors developed in this art individual buttons are used and when a large area is covered the buttons may be arranged in some definite outline to show a letter, character or design. This causes spots or bands of light to appear upon reflection from a source of light and the break in continuity detracts from the best lighting effect which would be a continuous coverage of the lighted surface with no interruptions.

Another disadvantage of the button type is that when the units are placed close together to form the equivalent of a continuous reflecting surface it is extremely difficult to clean the button surfaces or the surface between the buttons. In the present form long or continuous surfaces are provided both on the lens units and on the reflector units which are easily cleaned, and do not tend to become dull or indistinct in spots or areas by the collection of dust and dirt.

By making the lens units in connected cylindrical or similar forms, the equivalent of a lens system made of spherical surfaces is obtained and in addition, the cost of manufacture is greatly reduced since lenses with large surfaces or areas can be cast, or molded without expensive dies or glass making material.

The principle upon which this system operates depends upon the properties of the cylindrical lens which will focus a parallel beam of light in a line. The second cylindrical lens at right angles to the axis or cylindrical elements of the first lens, or at right angles to the line, will focus the line in a point. This property of two crossed cylindrical lenses holds for beams of light whose optical direction is appreciably oblique to the equivalent optical axis of the system or combination and makes them adapted for auto collimator reflection.

Crossed cylindrical lenses, therefore, have a focal point and if a reflecting surface is positioned behind or at the back of such a system whose radius of curvature is equal to the equivalent focal length of the system, a beam of light impinging on it will be returned parallel to the direction whence it came.

Areas made up of glass containing a front lens made with cylindrical corrugations and followed by a similar back member with cylindrical corrugations crossed at 90° to the front lens surface, and this refracting system followed by a reflecting surface containing spherical depressions each aligned with its respective cylindrical unit will produce a combination which is uniformly reflecting and extremely efficient as a reflector.

Since a cylindrical lens produces a line image of a beam of light, it is said in the art to produce an astigmatic image. Two astigmatic systems crossed at the proper angle will produce a point image. An oval lens whose aperture diameter in one direction is greater than its diameter at right angles thereto, crossed with another lens each of which produces an astigmatic image, will result in an anastigmatic image.

Broadly, then, this invention is in the provision of two or more astigmatic lens systems which, when placed together at the proper angle will produce an anastigmatic system of refraction having a resultant focal length. The focal length of a combination of two astigmatic lenses can be varied by varying the angle at which they are crossed. The resultant image, however, is always partially astigmatic. In many types of autocollimating reflecting systems this property can be used to control the dispersion of the reflected beam of light, which is necessary in reflectors used for highway reflecting signals or signs.

These astigmatic lenses can be crossed in a variety of combinations: the front and back cylindrical surfaces are not required to have the same curvature; the cylindrical surfaces need not be made of straight elements; they can be curved to assist in obtaining a larger angle of aspect; and they need not be of the same index of refraction.

Two or more separate cylindrical surfaces can form the front lens, and one, two, or more separate lenses may form the rear crossing lens. The advantage in using more components is to increase the convergency of the system so that the reflecting surface need not be located too far from the last glass surface, thereby preventing the design and system from being too thick. Additional components are chosen with curvature to partially correct the optical aberrations common in spherical systems.

The dihedral cross section of any cylindrical lens need not be limited to a circle, but may be a cartesian oval, a paraboloid or a section of an ellipse.

The lens combination and arrangement of this system provide a better correction for spherical aberration than is possible in a single flat front surface spherical lens, and in many other ways this system is superior for the particular use made of it as set forth herein.

Referring now more particularly to the drawings, a plurality of parallel cylindrical lenses 20 either separate or connected along their proximate edges, each with a flat plane surface 21 at the side opposite the lens, are disposed in cross relation with reference to similar lenses, preferably at right angles thereto, the lens plates either having their flat faces together as shown in Fig. 1, or being reversed and having their flat faces outwardly disposed as in Fig. 2.

Either system of crossed lenses is focused at the rear on a corresponding series of reflectors, upon a cylindrical reflector 22 having parallel cylindrical surfaces 23 as shown in Fig. 1 or upon a reflector 24 having a plurality of spherical depressions 25 corresponding to the crossed units in front of it. In the case of the reflector 22 the reflecting surface may be longitudinally parallel to the cylindrical lenses adjacent to it, or at right angles thereto.

The radius of curvature of the cylindrical reflecting surface 23 or the radius of curvature of the spherical surface 25 is approximately equal to the equivalent focal length of the anastigmatic combination which may be determined mathematically, by calculation or by a test and trial method as illustrated in Figs. 4 and 5. As shown, two straight cylindrical lenses A and B may be spaced apart as shown in Fig. 4 or placed more closely together as shown in Fig. 5 and the resultant focal length of the combination, with the lenses at right angles to each other will concentrate the incoming rays $x$ and $y$ in a point $z$ at the rear of the lenses at a distance from the rear lens surface upon a spherical reflector C which has a reflecting surface D whose radius of curvature is equal to the equivalent focal length of the anastigmatic combination of lenses. This curvature may be more or less dependent upon the lenses themselves, the coefficient of refraction and the distance of the lenses from each other.

Various forms of combinations of prism and lens structure are included and contemplated of which a few important types are shown. Although only single units are shown in Figs. 6 to 11 it is understood that these forms may be incorporated or produced in a combined lens structure as shown by Figs. 1 and 2.

In Fig. 6 the lenses 30 each comprise longitudinal prisms with surfaces 31 and 32 on each side of the center at an angle to each other, together with a reflector 33 located at the equivalent focal length of the system.

In Fig. 7 a combination of cylindrical lenses 34 is shown each having cylindrical surfaces 35 and 36 of different curvature arranged adjacent to each other and having flat sides disposed together with the opposite cylindrical surfaces at right angles, together with a spherical reflector 37 spaced therefrom.

In Fig. 8 each lens element comprises longitudinal sections of two cylindrical lenses 38 and 39 with flat sides together and the convex surfaces outwardly, together with a spherical reflector 40 having a reflecting surface of the proper curvature.

The lens combination of Fig. 7 is intended particularly to correct spherical aberration. The arrangement, as shown by Fig. 8, with the elements crossed at 90°, or slightly less, corrects oblique astigmatism; and if the lens sections are in the form of a paraboloid or a cartesian oval they also produce better optical correction for spherical aberration.

As shown in Fig. 9 a colored or a different lens 41, either round or oval, and preferably convex on both sides, may be combined with crossed lens sections 42 by inserting lens 41 in a recess 43 of each lens 42. By varying the colors of the lenses 41 a character, letter or design is easily built up in a system of connected sections 42 in the manner as shown by Fig. 1.

Still different effects may be produced by a crossed lens system as shown in Fig. 10 in which each of the crossed lenses comprises sections 44, 45 and 46 which together form a complete convex lens with a flat side, the different sections being of the same material or of different material, or one of the sections, as the middle one 45 having a different co-efficient of refraction, or being colored to produce a correspondingly different result.

Instead of having a separate reflector spaced from the refracting system it is also contemplated as shown in Fig. 11 that two crossed lens units 50 and 51 may be formed of refracting material and a reflector 52 may be cast integral or formed as a side unit with the rear lens unit 51 thereby forming a continuous refracting unit whose upper or outer part has a cylindrical lens surface 53 and whose bottom or rear part 52 has a spherical surface whose radius of curvature is equal to the equivalent focal length of the anastigmatic combination of the lenses 50 and 51 so that by silvering the rear spherical surface 54 a complete reflector is produced.

The combination thus variously shown, described, and referred to produces an extremely accurate and perfect correction for residual astigmatism caused by the two refracting surfaces inasmuch as the astigmatism of the cylindrical flat surface just offsets it. Furthermore, a system of this kind has an exceedingly large angle of aspect in all directions.

By combining two astigmatic elements with a lens having spherical surfaces as shown in Fig. 9 a further optical correction is obtained improving the anastigmatic system and by placing a colored spherical lens between two cylindrical elements or astigmatic lenses color or design is imparted to the integrated image as viewed from a distance.

While this system is particularly desirable and effective as an autocollimator reflector it may be used for illuminated signs and other retroflective uses.

I claim:

1. An auto-collimator reflector comprising two astigmatic lenses directly in contact and crossed approximately at right angles, and a curved reflecting surface at the focal distance of the system at the rear of the lenses whose radius of curvature is equal to the equivalent focal length of the anastigmatic combination.

2. An auto-collimator reflector comprising a system of astigmatic lenses crossed angularly in direct contact with each other and together forming an anastigmatic system, and a reflector disposed at the focal point of the lens system at the back thereof and having a reflecting surface whose radius of curvature is equal to the equivalent focal length of the anastigmatic system.

3. An auto-collimator reflector comprising two or more cylindrical lenses in contact with each other and crossed approximately at right angles for anastigmatic correction of the system produced thereby, and a curved reflecting surface disposed at the focal point back of and spaced from the lens system and having a radius of curvature equal to the equivalent focal length of the lens system.

4. An auto-collimator reflector comprising two or more cylindrical astigmatic lenses crossed angularly up to a right angle in direct contact with each other and forming an anastigmatic system, in combination with a reflector disposed at the focal distance of the system at the back of said system having a spherical reflecting surface whose radius of curvature is equal to the equivalent focal length of the system.

5. An auto-collimator reflector comprising a plurality of bar-like lens elements arranged close together and parallel, and a similar plurality of elements adjacent and disposed substantially at right angles thereto, the crossed elements being in direct contact and together defining a corrected lens system, and a reflector at the back thereof having a plurality of reflecting depressions disposed at the focal distance of the lens system of which the radii of curvature are equal to the equivalent focal length of the crossed elements of the system.

6. An auto-collimator reflector comprising a plurality of cylindrical lens elements connected together and extending parallel, in combination with a similar plurality and arrangement of elements disposed in direct contact therewith and at right angles with the lens portions disposed oppositely, the opposite lens portions forming a system of rectangular connected units, and a reflector disposed at the focal point for said system having a surface with a plurality of spherical depressions corresponding to the units.

7. In an auto-collimating reflector, a system of astigmatic cylindrical lenses crossed approximately at right angles and in direct contact with each other, in combination with a spherical lens incorporated in the system and located between the crossed lenses, and a cylindrical reflector disposed at the focal point at the back of the lens system.

8. A retroflective structure in accordance with claim 7 in which the spherical lens is seated in appropriate recesses in the proximate sides of the crossed lenses.

9. In an auto-collimating reflector, an anastigmatic system comprising two astigmatic lenses crossed substantially at right angles and disposed reversely in direct contact with each other, in combination with an astigmatic reflecting surface disposed at the focal point of the system whose radius of curvature is equal to the equivalent focal length of the crossed lenses.

10. In an auto-collimating reflector, an anastigmatic lens system comprising a plurality of cylindrical lenses disposed together and crossed at right angles to a plurality of similar lenses in direct contact with each other, each plurality of lenses having a common axis and one or more of each plurality of lenses having a different color than the others to impart color to the combination, and a reflecting surface at the back thereof disposed at the focal point of the system.

11. In an auto-collimating reflector, an anastigmatic lens system comprising a plurality of cylindrical lenses disposed together and crossed at right angles to a plurality of similar lenses in direct contact therewith, each plurality of lenses having a common axis and one or more of each plurality of lenses having a different index of refraction to vary the convergence of the rays, and a reflecting surface at the rear thereof disposed at a distance from the rear lens equivalent to the focal length of the system.

ARTHUR F. ECKEL.